(12) United States Patent
Sullivan et al.

(10) Patent No.: US 9,248,346 B2
(45) Date of Patent: *Feb. 2, 2016

(54) GOLF BALL COMPOSITIONS

(71) Applicant: Acushnet Company, Fairhaven, MA (US)

(72) Inventors: Michael J. Sullivan, Old Lyme, CT (US); David A. Bulpett, Boston, MA (US); Mark L. Binette, Mattapoisett, MA (US); Brian Comeau, Berkley, MA (US); Robert Blink, Newport, RI (US)

(73) Assignee: Acushnet Company, Fairhaven, MA (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/966,394

(22) Filed: Aug. 14, 2013

(65) Prior Publication Data

US 2013/0344994 A1   Dec. 26, 2013

Related U.S. Application Data

(63) Continuation-in-part of application No. 13/849,583, filed on Mar. 25, 2013, which is a continuation-in-part of application No. 13/531,906, filed on Jun. 25, 2012.

(51) Int. Cl.
| | |
|---|---|
| *A63B 37/00* | (2006.01) |
| *A63B 37/04* | (2006.01) |
| *C08L 23/08* | (2006.01) |
| *C08L 19/00* | (2006.01) |
| *C08K 5/14* | (2006.01) |

(52) U.S. Cl.
CPC ........... *A63B 37/007* (2013.01); *A63B 37/0024* (2013.01); *A63B 37/0039* (2013.01); *A63B 37/0051* (2013.01); *C08L 19/003* (2013.01); *C08L 23/0869* (2013.01); *C08K 5/14* (2013.01); *C08L 23/0876* (2013.01)

(58) Field of Classification Search
None
See application file for complete search history.

(56) References Cited

U.S. PATENT DOCUMENTS

| | | | | |
|---|---|---|---|---|
| 4,076,255 | A | * | 2/1978 | Moore et al. ................. 473/359 |
| 5,681,898 | A | * | 10/1997 | Pocklington ................. 525/193 |
| 5,733,974 | A | | 3/1998 | Yamada et al. |
| 5,779,561 | A | | 7/1998 | Sullivan et al. |
| 5,789,486 | A | | 8/1998 | Maruoka et al. |
| 6,186,906 | B1 | | 2/2001 | Sullivan et al. |
| 6,361,453 | B1 | | 3/2002 | Nakamura et al. |
| 6,465,573 | B1 | | 10/2002 | Maruko et al. |
| 7,402,114 | B2 | | 7/2008 | Binette et al. |
| 7,612,135 | B2 | | 11/2009 | Kennedy, III et al. |
| 2003/0216520 | A1 | | 11/2003 | Irii et al. |
| 2004/0266556 | A1 | * | 12/2004 | Sullivan et al. ............... 473/367 |
| 2008/0234070 | A1 | | 9/2008 | Comeau et al. |
| 2012/0165122 | A1 | | 6/2012 | Kim et al. |
| 2013/0344992 | A1 | * | 12/2013 | Bulpett et al. ................ 473/371 |

FOREIGN PATENT DOCUMENTS

GB         2163437    *   2/1986

* cited by examiner

*Primary Examiner* — David Buttner
(74) *Attorney, Agent, or Firm* — Mandi B. Milbank

(57) ABSTRACT

Disclosed herein are heterogeneous golf ball compositions comprising discrete particles of crosslinked rubber dispersed within an acid copolymer-based matrix.

7 Claims, No Drawings

GOLF BALL COMPOSITIONS

CROSS-REFERENCE TO RELATED APPLICATIONS

The present application is a continuation-in-part of U.S. patent application Ser. No. 13/849,583, filed Mar. 25, 2013, which is a continuation-in-part of U.S. patent application Ser. No. 13/531,906, filed Jun. 25, 2012, the entire disclosures of which are hereby incorporated herein by reference.

FIELD OF THE INVENTION

The present invention is directed to golf ball compositions comprising discrete particles of crosslinked rubber within a thermoplastic matrix.

BACKGROUND OF THE INVENTION

U.S. Pat. No. 5,789,486 to Maruoka et al. discloses a golf ball including a paint layer comprised of a dispersion of internally-crosslinked polymer gel fine particles.

U.S. Pat. No. 6,186,906 to Sullivan et al. discloses golf ball compositions comprising discrete particles of gel.

U.S. Pat. No. 7,402,114 to Binette et al. discloses golf ball materials comprising a partially to highly neutralized blend of copolymers, a fatty acid or fatty acid salt, and a heavy mass filler.

U.S. Pat. No. 7,612,135 to Kennedy, III et al. discloses golf ball materials comprising a partially to highly neutralized blend of an acid copolymer, a copolymer comprising a metallocene-catalyzed alpha-olefin and a softening comonomer, and a fatty acid or fatty acid salt.

U.S. Patent Application Publication No. 2008/0234070 to Comeau et al. discloses the use of crosslinked rubber nanoparticles in golf ball layers.

U.S. Pat. No. 5,733,974 to Yamada et al. discloses a golf ball comprising a core made of an elastomer and a cover covering said core wherein said cover is made of a thermoplastic material comprising a rubber powder and a thermoplastic elastomer.

U.S. Pat. No. 6,465,573 to Maruko et al. discloses a solid golf ball comprising a core, an intermediate layer, and a cover improved in rebound, distance, and feel when the intermediate layer is comprised of a thermoplastic resin in admixture with rubber powder.

U.S. Pat. No. 5,779,561 to Sullivan et al. discloses a golf ball including an inner cover layer comprising (1) a first resin composition containing at least 50 parts by weight of a non-ionomeric polyolefin material and (2) at least one part by weight of a filler.

U.S. Patent Application Publication No. 2003/0216520 to Irii et al. discloses a golf ball whose core is covered with a cover, wherein the core is constituted of a rubber composition containing polybutadiene rubber and the cover is constituted of a resin composition composed of ionomer resin and diene rubber.

U.S. Patent Application Publication No. 2012/0165122 to Kim et al. discloses a golf ball where at least one of the outer cover layer and the intermediate layer includes a blend composition of about 2 to about 40 wt % of a polyamide and about 60 to about 98 wt % of one or more of either a block copolymer, an acidic copolymer; an acidic terpolymer; an ionomer, or a multi component blend composition; and wherein the polyamide has a melting point which is greater than about 5 and less than about 200° C. above the melting point of the other blend component.

U.S. Pat. No. 6,361,453 to Nakamura et al. discloses a solid golf ball having a solid core and a cover, the solid core is composed of a core-forming material and particles of a different material.

SUMMARY OF THE INVENTION

The present invention is directed to a golf ball comprising a layer formed from a heterogeneous composition, the composition comprising a thermoplastic matrix and discrete particles dispersed within the matrix.

In a particular embodiment, the matrix is formed from an acid copolymer composition wherein the acid copolymer is selected from one or more E/X- and E/X/Y-type acid copolymers of ethylene, an $\alpha,\beta$-unsaturated carboxylic acid, and optionally a softening comonomer, the particles are formed from a rubber composition, and less than 5% of all acid groups present in the matrix composition are neutralized.

DETAILED DESCRIPTION

Golf ball compositions of the present invention are heterogeneous compositions comprising discrete particles of crosslinked material within a thermoplastic matrix. The heterogeneous composition is formed by adding the particles to the matrix composition either prior to or during the process of forming the golf ball layer.

In a particular embodiment, the heterogeneous composition has a solid sphere coefficient of restitution, "COR," within a range having a lower limit of 0.450 or 0.500 or 0.550 or 0.600 or 0.650 or 0.700 and an upper limit of 0.710 or 0.730 or 0.750 or 0.770 or 0.800 or 0.820 or 0.850 or 0.870 or 0.900 or 0.910 or 0.930. For purposes of the present disclosure, the "solid sphere COR" of a composition refers to the COR of an injection molded 1.55 inch diameter sphere of the composition. COR is determined according to a known procedure wherein a sphere is fired from an air cannon at two given velocities and calculated at a velocity of 125 ft/s. Ballistic light screens are located between the air cannon and the steel plate at a fixed distance to measure ball velocity. As the sphere travels toward the steel plate, it activates each light screen, and the time at each light screen is measured. This provides an incoming transit time period inversely proportional to the sphere's incoming velocity. The sphere impacts the steel plate and rebounds through the light screens, which again measures the time period required to transit between the light screens. This provides an outgoing transit time period inversely proportional to the sphere's outgoing velocity. COR is then calculated as the ratio of the outgoing transit time period to the incoming transit time period, $COR=V_{out}/V_{in}=T_{in}/T_{out}$.

In a particular embodiment, the heterogeneous composition has a solid sphere compression within a range having a lower limit of −75 or −50 or −20 or 0 or 10 or 15 and an upper limit of 20 or 25 or 30 or 35 or 40 or 50. In another particular embodiment, the heterogeneous composition has a solid sphere compression within a range having a lower limit of 70 or 75 or 80 or 85 or 90 and an upper limit of 90 or 95 or 100 or 105 or 115 or 120 or 125. In another particular embodiment, the heterogeneous composition has a solid sphere compression within a range having a lower limit of 120 or 130 or 140 or 150 or 155 or 160 and an upper limit of 160 or 165 or 170 or 180 or 190 or 200. In another particular embodiment, the heterogeneous composition has a solid sphere compression of 130 or greater, or 140 or greater, or 150 or greater, or 155 or greater, or 160 or greater, or 165 or greater, or 170 or greater. For purposes of the present disclosure, the "solid sphere compression" of a composition refers to the compression of an injection molded 1.55 inch diameter sphere of the composition. The compression of the sphere is determined according to a known procedure, using a digital Atti compression test device, wherein a piston is used to compress a sphere against a spring. Conversion from Atti compression to Riehle (cores), Riehle (balls), 100 kg deflection, 130-10 kg deflection or effective modulus can be carried out according to the formulas given in Jeff Dalton's *Compression by Any Other Name, Science and Golf IV, Proceedings of the World Scientific Congress of Golf* (Eric Thain ed., Routledge, 2002).

In a particular embodiment, the heterogeneous composition has a flexural modulus, as measured according to the method given in the Examples below, of 5 ksi or greater, 6 ksi or greater, or 8 ksi or greater, or 10 ksi or greater, or 15 ksi or greater, or 20 ksi or greater, or 25 ksi or greater, or 30 ksi or greater, or 35 ksi or greater, or 40 ksi or greater, or 45 ksi or greater, or 48 ksi or greater, or 50 ksi or greater, or 52 ksi or greater, or 55 ksi or greater, or 60 ksi or greater, or 63 ksi or greater, or 65 ksi or greater, or 70 ksi or greater, 100 ksi or greater, or 120 ksi or greater, or 150 ksi or greater, or 160 ksi or greater, or 170 ksi or greater, or 180 ksi or greater, or 195 ksi or greater, or a flexural modulus within a range having a lower limit of 5 or 6 or 8 or 10 or 15 or 20 or 25 or 30 or 35 or 40 or 45 or 48 or 50 or 52 or 55 or 55 or 60 or 63 or 65 or 70 ksi and an upper limit of 75 or 80 or 85 or 90 or 95 or 100 or 105 or 110 or 115 ksi, or a flexural modulus within a range having a lower limit of 20 or 25 or 30 or 35 or 40 or 45 or 50 or 55 or 60 ksi and an upper limit of 60 or 65 or 70 or 75 or 80 ksi, or a flexural modulus within a range having a lower limit of 50 or 60 or 70 or 90 or 120 or 130 and an upper limit of 150 or 170 or 200 or 210.

In a particular embodiment, the particles are present in the composition in an amount of 1 wt % or greater, or 2 wt % or greater, or 3 wt % or greater, or 5 wt % or greater, or 10 wt % or greater, or 15 wt % or greater, or 18 wt % or greater, or 20 wt % or greater, or 25 wt % or greater, or 30 wt % or greater, or 35 wt % or greater, or 40 wt % or greater, or 45 wt % or greater, or 50 wt % or greater, or 55 wt % or greater, or 60 wt % or greater, or an amount within a range having a lower limit of 1 or 2 or 3 or 5 or 10 or 15 or 20 or 25 or 30 or 35 or 40 wt % and an upper limit of 50 or 55 or 60 or 65 or 70 or 75 or 80 or 85 or 90 wt %, based on the total weight of the composition.

In another particular embodiment, the composition comprises at least 500 of the discrete particles.

In a particular embodiment, the particles have a maximum particle size of 0.595 mm or 0.707 mm or 0.841 mm or 0.900 mm or 1.00 mm or 1.19 mm or 1.41 mm or 1.68 mm or 2.00 mm or 2.38 mm. In another embodiment, the crosslinked particles have a particle size within a range having a lower limit of 0.001 mm or 0.002 mm or 0.005 mm or 0.007 mm or 0.015 mm or 0.030 mm or 0.037 or mm or 0.074 mm and an upper limit of 0.100 mm or 0.125 mm or 0.177 mm or 0.354 mm or 0.420 mm or 0.500 mm or 0.595 mm or 0.707 mm or 0.841 mm or 1.000 mm or 1.19 mm or 1.41 mm or 1.68 mm or 2.00 mm or 2.38 mm.

Particle Composition

For purposes of the present invention, the particle composition is crosslinked and ground into particles prior to being added to the matrix composition.

Rubber compositions suitable for forming the particles include a base rubber selected from natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations of two or more thereof. Diene rubbers are preferred, particularly polybutadiene, styrene-butadiene, acrylonitrile butadiene, and mixtures of polybutadiene with other elastomers wherein the amount of polybutadiene present is at least 40 wt % based on the total polymeric weight of the mixture.

Non-limiting examples of suitable commercially available rubbers are Buna CB high-cis neodymium-catalyzed polybutadiene rubbers, such as Buna CB 23, Buna CB24 and Buna CB high-cis cobalt-catalyzed polybutadiene rubbers, such as Buna CB 1203, 1220 and 1221, commercially available from Lanxess Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; Neodene high-cis neodymium-catalyzed polybutadiene rubbers, such as Neodene BR 40, commercially available from Karbochem; TP-301 transpolyisoprene, commercially available from Kuraray Co., Ltd.; Vestenamer® polyoctenamer, commercially available from Evonik Industries; Butyl 065 and Butyl 288 butyl rubbers, commercially available from ExxonMobil Chemical Company; Butyl 301 and Butyl 101-3, commercially available from Lanxess Corporation; Bromobutyl 2224 and Chlorobutyl 1066 halobutyl rubbers, commercially available from ExxonMobil Chemical Company; Bromobutyl X2 and Chlorobutyl 1240 halobutyl rubbers, commercially available from Lanxess Corporation; BromoButyl 2255 butyl rubber, commercially available from Japan Synthetic Rubber Co., Ltd.; Vistalon® 404 and Vistaion® 706 ethylene propylene rubbers, commercially available from ExxonMobil Chemical Company; Dutral CO 058 ethylene propylene rubber, commercially available from Polimeri Europa; Nordel® IP NDR 5565 and Nordel® IP 3670 ethylene-propylene-diene rubbers, commercially available from The Dow Chemical Company; EPT1045 and EPT1045 ethylene-propylene-diene rubbers, commercially available from Mitsui Corporation; Buna SE 1721 TE styrene-butadiene rubbers, commercially available from Lanxess Corporation; Afpol 1500 and Afpol 552 styrene-butadiene rubbers, commercially available from Karbochem; Nipol® DN407 and Nipol® 1041L acrylonitrile butadiene rubbers, commercially available from Zeon Chemicals, L.P.; Neoprene GRT and Neoprene AD30 polychloroprene rubbers; Vamac® ethylene acrylic elastomers, commercially available from E. I. du Pont de Nemours and Company; Hytemp® AR12 and AR214 alkyl acrylate rubbers, commercially available from Zeon Chemicals, L.P.; Hypalon® chlorosulfonated polyethylene rubbers, commercially available from E. I. du Pont de Nemours and Company; and Goodyear Budene® 1207 polybutadiene, commercially available from Goodyear Chemical.

The rubber is crosslinked using, for example, a peroxide or sulfur cure system, C—C initiators, high energy radiation sources capable of generating free radicals, resin cure, or a combination thereof.

In a particular embodiment, the rubber is crosslinked using a peroxide initiator and optionally a coagent. Suitable peroxide initiators include, but are not limited to, organic peroxides, such as dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide;

dibenzoyl peroxide; t-butyl hydroperoxide; lauryl peroxide; benzoyl peroxide; and combinations thereof. Examples of suitable commercially available peroxides include, but are not limited to Perkadox® BC dicumyl peroxide, commercially available from Akzo Nobel, and Varox® peroxides, such as Varox® ANS benzoyl peroxide and Varox® 231 1,1-di(t-butylperoxy)3,3,5-trimethylcyclohexane, commercially available from RT Vanderbilt Company, Inc.

Coagents are commonly used with peroxides to increase the state of cure. Suitable coagents include, but are not limited to, metal salts of unsaturated carboxylic acids; unsaturated vinyl compounds and polyfunctional monomers (e.g., trimethylolpropane trimethacrylate); maleimides (e.g., phenylene bismaleimide); and combinations thereof. Particular examples of suitable metal salts of unsaturated carboxylic acids include, but are not limited to, one or more metal salts of acrylates, diacrylates, methacrylates, and dimethacrylates, wherein the metal is selected from magnesium, calcium, zinc, aluminum, lithium, nickel, and sodium. In a particular embodiment, the coagent is selected from zinc salts of acrylates, diacrylates, methacrylates, dimethacrylates, and mixtures thereof. In another particular embodiment, the coagent is zinc diacrylate.

The amount of peroxide initiator and coagent can be varied to achieve the desired hardness of the crosslinked particle composition. For example, in one embodiment, the crosslinked particle composition is a coagent-cured rubber comprising a peroxide initiator and a high level of coagent (e.g., 35 phr or greater, or greater than 35 phr, or 50 phr or greater, or greater than 50 phr, or 75 phr or greater, or greater than 75 phr of coagent, or 100 phr or greater, or 150 hr or greater, or 200 phr or greater, or 250 phr or greater, or 300 phr or greater, or 350 phr or greater, or 400 phr or greater). In a particular aspect of this embodiment, the crosslinked particle composition has a Shore D hardness of 55 or greater, or greater than 55, or 60 or greater, or greater than 60, or 65 or greater, or greater than 65, or 70 or greater, or greater than 70, or 75 or greater, or greater than 75, or 80 or greater, or greater than 80, or 85 or greater, or greater than 85, or 90 or greater, or greater than 90. In another embodiment, the crosslinked particle composition is a peroxide-cured rubber comprising a peroxide initiator and is free of coagent, substantially free of coagent (i.e., <1 phr coagent), or includes a low level of coagent (e.g., 10 phr or less, or less than 10 phr, or 5 phr or less, or less than 5 phr, or 1 phr or less, or less than 1 phr). In a particular aspect of this embodiment, the crosslinked particle composition has a Shore C hardness of 50 or less, or less than 50, or 45 or less, or less than 45, or 40 or less, or less than 40, or 35 or less, or less than 35, or 30 or less, or less than 30, or 25 or less, or less than 25, or 20 or less, or less than 20, or 15 or less, or 12 or less, or or less, or a Shore A hardness of 55 or less, or less than 55, or 50 or less, or less than 50, or 40 or less, or 30 or less. In another embodiment, the crosslinked particle composition is a peroxide-cured rubber comprising a peroxide initiator and a coagent, wherein the peroxide initiator is present in an amount of at least 0.05 phr, or an amount within a range having a lower limit of 0.05 or 0.1 or 0.8 or 1 or 1.25 or 1.5 phr and an upper limit of 2.5 or 3 or 5 or 6 or 10 or 15 phr, and wherein the coagent is present in an amount within a range having a lower limit of 1 or 5 or 10 or 15 or 19 or 20 phr and an upper limit of 24 or 25 or 30 or 35 or 40 or 45 or 50 or 60 phr. In a particular aspect of this embodiment, the crosslinked particle composition has a Shore C hardness within a range having a lower limit of 20 or 25 or 30 or 35 or 40 or 45 or 50 or 55 or 60 or 70 or 80 or 82 or 85 and an upper limit of 60 or 70 or 75 or 80 or 90 or 92 or 93 or 95, wherein the upper limit is greater than the lower limit (e.g., when the lower limit is 70, the upper limit is 75, 80, 90, 92, 93, or 95).

In another particular embodiment, the rubber is crosslinked using sulfur and/or an accelerator. Suitable accelerators include, but are not limited to, guanidines (e.g., diphenyl guanidine, triphenyl guanidine, and di-ortho-tolyl guanidine); thiazoles (e.g., mercaptobenzothiazole, dibenzothiazyldisulfide, sodium salt of mercaptobenzothiazole, zinc salt of mercaptobenzothiazole, and 2,4-dinitrophenyl mercaptobenzothiazole); sulfenamides (e.g., N-cyclohexylbenzothiazylsulfenamide, N-oxydiethylbenzothiazylsulfenamide, N-t-butylbenzothiazylsulfenamide, and N,N'-dicyclohexylbenzothiazylsulfenamide); thiuram sulfides (e.g., tetramethyl thiuram disulfide, tetraethyl thiuram disulfide, tetrabutylthiuram disulfide, tetramethyl thiuram monosulfide, dipentamethylene thiuram tetrasulfate, 4-morpholinyl-2-benzothiazole disulfide, and dipentamethylenethiuram hexasulfide); dithiocarbamates (e.g., piperidine pentamethylene dithiocarbamate, zinc diethyl dithiocarbamate, sodium diethyl dithiocarbamate, zinc ethyl phenyl dithiocarbamate, and bismuth dimethyldithiocarbamate); thioureas (e.g., ethylene thiourea, N,N'-diethylthiourea, and N,N'-diphenylthiourea); xanthates (e.g., zinc isopropyl xanthate, sodium isopropyl xanthate, and zinc butyl xanthate); dithiophosphates; and aldehyde amines (e.g., hexamethylene tetramine and ethylidene aniline).

The crosslinking system optionally includes one or more activators selected from metal oxides (e.g., zinc oxide and magnesium oxide), and fatty acids and salts of fatty acids (e.g., stearic acid, zinc stearate, oleic acid, and dibutyl ammonium oleate).

The rubber particle composition optionally includes a scorch retarder to prevent scorching of the rubber during processing before vulcanization. Suitable scorch retarders include, but are not limited to, salicylic acid, benzoic acid, acetylsalicylic acid, phthalic anhydride, sodium acetate, and N-cyclohexylthiophthalimide.

The rubber particle composition optionally includes one or more antioxidants to inhibit or prevent the oxidative degradation of the base rubber. Some antioxidants also act as free radical scavengers; thus, when antioxidants are included in the crosslinked particle composition, the amount of initiator agent used may be as high as or higher than the amounts disclosed herein. Suitable antioxidants include, but are not limited to, hydroquinoline antioxidants, phenolic antioxidants, and amine antioxidants.

The rubber particle composition optionally includes from 0.05 phr to 10.0 phr of a soft and fast agent selected from organosulfur and metal-containing organosulfur compounds; organic sulfur compounds, including mono, di, and polysulfides, thiol, and mercapto compounds; inorganic sulfide compounds; blends of an organosulfur compound and an inorganic sulfide compound; Group VIA compounds; substituted and unsubstituted aromatic organic compounds that do not contain sulfur or metal; aromatic organometallic compounds; hydroquinones; benzoquinones; quinhydrones; catechols; resorcinols; and combinations thereof. In a particular embodiment, the soft and fast agent is selected from zinc pentachlorothiophenol, pentachlorothiophenol, ditolyl disulfide, diphenyl disulfide, dixylyl disulfide, 2-nitroresorcinol, and combinations thereof.

The rubber particle composition optionally contains one or more fillers. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, core material that is ground and recycled, nanofillers and combinations thereof. The amount of particulate material(s) present in the rubber particle composition is typically within a range having a lower limit of 5 parts or 10 parts by weight per 100 parts of the base polymer, and an upper limit of 30 parts or 50 parts or 100 parts by weight per 100 parts of the base polymer. Filler materials may be dual-functional fillers, such as zinc oxide (which may be used as a filler/acid scavenger) and titanium dioxide (which may be used as a filler/brightener material).

The rubber particle composition may also contain one or more additives selected from processing aids, such as transpolyisoprene (e.g., TP-301 transpolyisoprene, commercially available from Kuraray Co., Ltd.), transbutadiene rubber, and polyalkenamer rubber; processing oils; plasticizers; coloring agents; fluorescent agents; chemical blowing and foaming agents; defoaming agents; stabilizers; softening agents; impact modifiers; free radical scavengers; antiozonants (e.g., p-phenylenediames); and the like. The amount of additive(s) typically present in the crosslinked particle composition is typically within a range having a lower limit of 0 parts or 5 parts by weight per 100 parts of the base polymer, and an upper limit of 10 parts or 20 parts or 50 parts or 100 parts or 150 parts by weight per 100 parts of the base polymer.

Suitable types and amounts of rubber, initiator agent, coagent, filler, and additives are more fully described in, for example, U.S. Pat. Nos. 6,566,483, 6,695,718, 6,939,907, 7,041,721, and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Preferably, the crosslinked particles are formed from a rubber composition that is substantially free of reactive metal ingredients including, for example, reactive metal-containing coagents, reactive metal-containing soft and fast agents, reactive metal-containing fillers and processing aids, reactive metal oxides, reactive metal carbonates, reactive metal carboxylates, and reactive metals and metal alloys (e.g., zinc diacrylate, zinc pentachlorothiophenol, zinc stearate, and the like).

In a particular embodiment, the crosslinked particle composition has a Shore D hardness within a limit having a lower limit of 20 or 30 or 35 or 45 or 55 and an upper limit of 55 or 60 or 65 or 70 or 75 or 80 or 85 or 90 or 95, or a Shore D hardness of 55 or greater, or greater than 55, or 60 or greater, or greater than 60, or 65 or greater, or greater than 65, or 70 or greater, or greater than 70, or 75 or greater, or greater than 75, or 80 or greater, or greater than 80, or 85 or greater, or greater than 85, or 90 or greater, or greater than 90.

In another particular embodiment, the crosslinked rubber particle composition has a Shore C hardness of 50 or less, or less than 50, or 45 or less, or less than 45, or 40 or less, or less than 40, or 35 or less, or less than 35, or 30 or less, or less than 30, or 25 or less, or less than 25, or 20 or less, or less than 20, or 15 or less, or 12 or less, or 10 or less.

In another particular embodiment, the crosslinked rubber particle composition has a Shore A hardness of 55 or less, or less than 55, or 50 or less, or less than 50, or 40 or less, or or less.

In another particular embodiment, the crosslinked rubber particle composition has a Shore C hardness within a range having a lower limit of 20 or 25 or 30 or 35 or 40 or 45 or 50 or 55 or 60 or 70 or 80 or 82 or 85 and an upper limit of 60 or 70 or 75 or 80 or 90 or 92 or 93 or 95, wherein the upper limit is greater than the lower limit (e.g., when the lower limit is 70, the upper limit is 75, 80, 90, 92, 93, or 95).

For purposes of the present disclosure, the hardness of the crosslinked rubber particle composition refers to the surface hardness of a 0.25 inch plaque of the composition cured under the same conditions as those used to cure the particle composition that is added to the matrix composition to form the heterogeneous composition. Hardness measurements are made pursuant to ASTM D-2240 using a calibrated, digital durometer, capable of reading to 0.1 hardness units and set to record the maximum hardness reading obtained for each measurement.

Thermoplastic Matrix Composition

In a particular embodiment, the matrix composition is non-ionomeric, i.e., the matrix composition does not include an ionomer. In another particular embodiment, the matrix composition includes an ionomer in an amount of 70 wt % or less, or 65 wt % or less, or 60 wt % or less, or 55 wt % or less, or 50 wt % or less, or less than 50 wt %, or 40 wt % or less, or wt % or less, or 30 wt % or less, or 25 wt % or less, or 20 wt % or less, or 15 wt % or less, or 10 wt % or less, or 5 wt % or less, based on the total polymeric weight of the matrix composition. In another particular embodiment, the matrix composition includes an ionomer in an amount of 5 wt % or greater, or 10 wt % or greater, or 20 wt % or greater, or 25 wt % or greater, or 40 wt % or greater, or 50 wt % or greater, or 55 wt % or greater, or 70 wt % or greater, or 90 wt % or greater, or 95 wt % or greater, or 99 wt % or greater, or 100 wt %, based on the total polymeric weight of the matrix composition.

Suitable ionomer compositions include partially neutralized ionomers and highly neutralized ionomers, including ionomers formed from blends of two or more partially neutralized ionomers, blends of two or more highly neutralized ionomers, and blends of one or more partially neutralized ionomers with one or more highly neutralized ionomers. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. As used herein, "(meth) acrylic acid" means methacrylic acid and/or acrylic acid. Likewise, "(meth)acrylate" means methacrylate and/or acrylate. Y is preferably selected from (meth) acrylate and alkyl (meth) acrylates wherein the alkyl groups have from 1 to 8 carbon atoms, including, but not limited to, n-butyl (meth)acrylate, isobutyl (meth)acrylate, methyl (meth)acrylate, and ethyl (meth) acrylate. Particularly preferred O/X/Y-type copolymers are ethylene/(meth) acrylic acid/n-butyl (meth)acrylate, ethylene/(meth) acrylic acid/isobutyl (meth)acrylate, ethylene/(meth) acrylic acid/methyl (meth)acrylate, and ethylene/(meth) acrylic acid/ethyl (meth) acrylate. The acid is typically present in the acid copolymer in an amount of 6 wt % or greater, or 9 wt % or greater, or 10 wt % or greater, or 11 wt % or greater, or 15 wt % or greater, or 16 wt % or greater, or 19 wt % or greater, or 20 wt % or greater, or in an amount within a range having a lower limit of 1 or 4 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The acid copolymer is at least partially neutralized with a cation source, optionally in the presence of a high molecular weight organic acid, such as those disclosed in U.S. Pat. No. 6,756, 436, the entire disclosure of which is hereby incorporated herein by reference. In a particular embodiment, less than 40% of the acid groups present in the composition are neutralized. In another particular embodiment, from 40% to 60% of the acid groups present in the composition are neutralized. In another particular embodiment, from 60% to 70% of the acid groups present in the composition are neutralized. In another particular embodiment, from 60% to 80% of the acid groups present in the composition are neutralized. In another particular embodiment, from 70% to 80% of the acid groups present in the composition are neutralized. In another embodiment, from 80% to 100% of the acid groups present in the composition are neutralized. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, tin, lithium, and rare earth metals. In a particular embodiment, the ionomer composition includes a bimodal ionomer, for example, DuPont® AD1043 ionomers, and the ionomers disclosed in U.S. Patent Application Publication No. 2004/ 0220343 and U.S. Pat. Nos. 6,562,906, 6,762,246 and 7,273, 903, the entire disclosures of which are hereby incorporated herein by reference. Suitable ionomers are further disclosed, for example, in U.S. Patent Application Publication Nos. 2005/0049367, 2005/0148725, 2005/0020741, 2004/ 0220343, and 2003/0130434, and U.S. Pat. Nos. 5,587,430, 5,691,418, 5,866,658, 6,100,321, 6,562,906, 6,653,382, 6,756,436, 6,777,472, 6,762,246, 6,815,480, 6,894,098, 6,919,393, 6,953,820, 6,994,638, 7,375,151, and 7,652,086, the entire disclosures of which are hereby incorporated herein by reference.

Also suitable are polyester ionomers, including, but not limited to, those disclosed, for example, in U.S. Pat. Nos. 6,476,157 and 7,074,465, the entire disclosures of which are hereby incorporated herein by reference.

Also suitable are thermoplastic elastomers comprising a silicone ionomer, as disclosed, for example, in U.S. Pat. No. 8,329,156, the entire disclosure of which is hereby incorporated herein by reference.

Suitable non-ionomeric polymers for forming the matrix include:
 (a) non-ionomeric acid copolymers, particularly O/X- and O/X/Y-type acid copolymers, wherein O is an α-olefin preferably selected from ethylene and propylene, X is a $C_3$-$C_8$ α,β-ethylenically unsaturated carboxylic acid preferably selected from methacrylic acid, acrylic acid, ethacrylic acid, crotonic acid, and itaconic acid, and Y is a softening monomer;
 (b) polyesters, and polyesters modified with a compatibilizing group such as sulfonate or phosphonate, including poly(ethylene terephthalate), poly(butylene terephthalate), poly(propylene terephthalate), poly(trimethylene terephthalate), poly(ethylene naphthenate), and derivates thereof, including, but not limited to, those disclosed in U.S. Pat. Nos. 6,353,050, 6,274,298, and 6,001,930, the entire disclosures of which are hereby incorporated herein by reference;
 (c) polyamides, polyether amides, and polyester amides, including, but not limited to, those disclosed in U.S. Pat. Nos. 6,187,864, 6,001,930, and 5,981,654, the entire disclosures of which are hereby incorporated herein by reference;
 (d) polyimides, polyetherketones, and polyamideimides;
 (e) polyurethanes, polyureas, and copolymers and blends thereof, including, but not limited to, those disclosed in U.S. Pat. Nos. 5,334,673, 5,484,870, 6,506,851, 6,756, 436, 6,835,794, 6,867,279, 6,960,630, and 7,105,623, U.S. Patent Application Publication No. 2007/0117923, and U.S. Patent Application Ser. Nos. 60/401,047 and 13/613,095, the entire disclosures of which are hereby incorporated herein by reference;
 (f) polystyrenes, such as poly(styrene-co-maleic anhydride), acrylonitrile-butadiene-styrene, poly(styrene sulfonate), polyethylene styrene;
 (g) polypropylenes, polyethylenes, and copolymers of propylene and ethylene;
 (h) ethylene elastomers;
 (i) propylene elastomers;
 (j) styrenic copolymers and styrenic block copolymers;
 (k) dynamically vulcanized elastomers;
 (l) ethylene vinyl acetates;
 (m) polyvinyl chlorides;
 (n) engineering thermoplastic vulcanizates, such as those disclosed, for example, in U.S. Patent Application Publication No. 2008/0132359, the entire disclosure of which is hereby incorporated herein by reference;
 (o) functionalized derivatives of the above; and
 (p) combinations of two or more thereof.

In a particular embodiment, the matrix is formed from a blend of at least two different polymers. In a particular aspect of this embodiment, at least one polymer is an ionomer.

In another particular embodiment, the matrix is formed from a blend of at least a first and a second ionomer.

In another particular embodiment, the matrix is formed from a blend of one or more ionomers and one or more additional polymers selected from non-ionomeric polyolefins, polyesters, polyamides, polyurethanes, polystyrenes, and functionalized derivatives thereof.

In another particular embodiment, the matrix is formed from a blend of at least a functionalized polyethylene and a functionalized polymer selected from polyethylenes, including metallocene-catalyzed and non-metallocene-catalyzed polyethylenes, ethylene vinyl acetates, ethylene acid copolymers, ethylene acrylate copolymers, ethylene elastomers, and polypropylenes. In a particular aspect of this embodiment, the functionalized polyethylene is a maleic anhydride-grafted polymer selected from ethylene homopolymers, ethylene-hexene copolymers, ethylene-octene copolymers, and ethylene-butene copolymers.

In another particular embodiment, the matrix is formed from a blend of at least an ionomer and a functionalized polymer selected from polyethylenes, including metallocene-catalyzed and non-metallocene-catalyzed polyethylenes, ethylene vinyl acetates, ethylene acid copolymers, ethylene elastomers, and polypropylenes. In a particular aspect of this embodiment, the functionalized polymer is a polyethylene selected from ethylene homopolymers, ethylene-hexene copolymers, ethylene-octene copolymers, and ethylene-butene copolymers.

In another particular embodiment, the matrix is formed from a blend of at least an ionomer and an acid copolymer.

In another particular embodiment, the matrix is formed from a blend of at least an ionomer and a styrenic block copolymer or functionalized derivative thereof.

In another particular embodiment, the matrix is formed from a blend of at least an ionomer and an ethylene acrylate based polymer or functionalized derivative thereof.

In another particular embodiment, the matrix is formed from a blend of at least an ionomer and a polyoctenamer or a functionalized derivative thereof.

In another particular embodiment, the matrix is formed from a blend including at least an ionomer and a thermoplastic polyurethane. In a particular aspect of this embodiment, the polyurethane is selected from the polyurethanes disclosed in U.S. Patent Application Publication No. 2005/0256294, the entire disclosure of which is hereby incorporated herein by reference.

In another particular embodiment, the matrix is formed from a blend including:
(a) a first component selected from polyester elastomers (e.g., Hytrel® polyester elastomers, commercially available from E. I. du Pont de Nemours and Company, and Riteflex® polyester elastomers, commercially available from Ticona); polyether block amides (e.g., Pebax® polyether and polyester amides); polyester-ether amides; and polypropylene ether glycol compositions, such as those disclosed, e.g., in U.S. Patent Application Publication No. 2005/0256294, the entire disclosure of which is hereby incorporated herein by reference; and combinations of two or more thereof;
(b) a second component selected from O/X/Y-type and O/X-type ionomers, including partially and highly-neutralized ionomers, particularly highly neutralized ionomers comprising fatty acid salts, such as DuPont® HPF 1000 and HPF 2000 highly neutralized ionomers, and VLMI-type ionomers, such as Surlyn® 9320 ionomer; O/X/Y-type acid copolymers; and polyamides and polyamide blends, particularly selected from the polyamides and polyamide blends disclosed above.

In a particular aspect of this embodiment, the matrix is formed from a blend including at least a polyester elastomer and a highly neutralized ionomer comprising fatty acid salts. Such blend is disclosed, for example, in U.S. Pat. No. 7,375,151, the entire disclosure of which is hereby incorporated herein by reference.

Non-limiting examples of suitable commercially available thermoplastics for use in forming the matrix are Surlyn® ionomers, DuPont® HPF 1000 and HPF 2000 highly neutralized ionomers, and DuPont® AD 1043 ionomers, commercially available from E. I. du Pont de Nemours and Company; Clarix® ionomers, commercially available from A. Schulman, Inc.; Iotek® ionomers, commercially available from ExxonMobil Chemical Company; Amplify® IO ionomers, commercially available from The Dow Chemical Company; Amplify® GR functional polymers and Amplify® TY functional polymers, commercially available from The Dow Chemical Company; Fusabond® functionalized polymers, including ethylene vinyl acetates, polyethylenes, metallocene-catalyzed polyethylenes, ethylene propylene rubbers, and polypropylenes, commercially available from E. I. du Pont de Nemours and Company; Exxelor® maleic anhydride grafted polymers, including high density polyethylene, polypropylene, semi-crystalline ethylene copolymer, amorphous ethylene copolymer, commercially available from ExxonMobil Chemical Company; ExxonMobil® PP series polypropylene impact copolymers, such as PP7032E3, PP7032KN, PP7033E3, PP7684KN, commercially available from ExxonMobil Chemical Company; Vistamaxx® propylene-based elastomers, commercially available from ExxonMobil Chemical Company; Vistalon® EPDM rubbers, commercially available from ExxonMobil Chemical Company; Exact® plastomers, commercially available from ExxonMobil Chemical Company; Santoprene® thermoplastic vulcanized elastomers, commercially available from ExxonMobil Chemical Company; Nucrel® acid copolymers, commercially available from E. I. du Pont de Nemours and Company; Escor® acid copolymers, commercially available from ExxonMobil Chemical Company; Primacor® acid copolymers, commercially available from The Dow Chemical Company; Kraton® styrenic block copolymers, commercially available from Kraton Performance Polymers Inc.; Septon® styrenic block copolymers, commercially available from Kuraray Co., Ltd.; Lotader® ethylene acrylate based polymers, commercially available from Arkema Corporation; Polybond® grafted polyethylenes and polypropylenes, commercially available from Chemtura Corporation; Royaltuf® chemically modified EPDM, commercially available from Chemtura Corporation; Vestenamer® polyoctenamer, commercially available from Evonik Industries; Pebax® polyether and polyester amides, commercially available from Arkema Inc.; polyester-based thermoplastic elastomers, such as Hytrel® polyester elastomers, commercially available from E. I. du Pont de Nemours and Company, and Riteflex® polyester elastomers, commercially available from Ticona; Estane® thermoplastic polyurethanes, commercially available from The Lubrizol Corporation; Grivory® polyamides and Grilamid® polyamides, commercially available from EMS Grivory; Zytel® polyamide resins and Elvamide® nylon multipolymer resins, commercially available from E. I. du Pont de Nemours and Company; and Elvaloy® acrylate copolymer resins, commercially available from E. I. du Pont de Nemours and Company.

The matrix composition optionally includes additive(s) and/or filler(s) in an amount of 50 wt % or less, or 30 wt % or less, or 20 wt % or less, or 15 wt % or less, based on the total weight of the matrix composition. Suitable additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, performance additives (e.g., A-C® performance additives, particularly A-C® low molecular weight ionomers and copolymers, A-C® oxidized polyethylenes, A-C® ethylene vinyl acetate waxes, and AClyn® low molecular weight ionomers, commercially available from Honeywell International Inc.), fatty acid amides (e.g., ethylene bis-stearamide and ethylene bis-oleamide), fatty acids and salts thereof (e.g., stearic acid, oleic acid, zinc stearate, magnesium stearate, zinc oleate, and magnesium oleate), oxides (e.g., zinc oxide, tin oxide, iron oxide, calcium oxide, aluminum oxide, titanium dioxide, magnesium oxide, and zirconium oxide), carbonates (e.g., calcium carbonate, zinc carbonate, barium carbonate, and magnesium carbonate), barium sulfate, zinc sulfate, tungsten, tungsten carbide, silica, lead silicate, clay, mica, talc, nano-fillers, carbon black, glass flake, milled glass, flock, fibers, and mixtures thereof. Suitable additives and fillers are more fully described in, for example, U.S. Patent Application Publication No. 2003/0225197, the entire disclosure of which is hereby incorporated herein by reference. In a particular embodiment, the total amount of additive(s) and filler(s) present in the matrix composition is 20 wt % or less, or 15 wt % or less, or 12 wt % or less, or 10 wt % or less, or 9 wt % or less, or 6 wt % or less, or 5 wt % or less, or 4 wt % or less, or 3 wt % or less, or within a range having a lower limit of 0 or 2 or 3 or 5 wt %, based on the total weight of the matrix composition, and an upper limit of 9 or 10 or 12 or 15 or 20 wt %, based on the total weight of the matrix composition. In a particular aspect of this embodiment, the matrix composition includes filler(s) selected from carbon black, micro- and nano-scale clays and organoclays, including (e.g., Cloisite® and Nanofil® nanoclays, commercially available from Southern Clay Products, Inc.; Nanomax® and Nanomer® nanoclays, commercially available from Nanocor, Inc., and Perkalite® nanoclays, commercially available from Akzo Nobel Polymer Chemicals), micro- and nano-scale talcs (e.g., Luzenac HAR® high aspect ratio talcs, commercially available from Luzenac America, Inc.), glass (e.g., glass flake, milled glass, microglass, and glass fibers), micro- and nano-scale mica and mica-based pigments (e.g., Iriodin® pearl luster pigments, commercially available from The Merck Group), and combinations thereof. Particularly suitable combinations of fillers include, but are not limited to, micro-scale filler(s) combined with nano-scale filler(s), and organic filler(s) with inorganic filler(s).

The matrix composition optionally includes one or more melt flow modifiers. Suitable melt flow modifiers include materials which increase the melt flow of the composition, as measured using ASTM D-1238, condition E, at 190° C., using a 2160 gram weight. Examples of suitable melt flow modifiers include, but are not limited to, fatty acids and fatty acid salts, including, but not limited to, those disclosed in U.S. Pat. No. 5,306,760, the entire disclosure of which is hereby incorporated herein by reference; fatty amides; polyhydric alcohols, including, but not limited to, those disclosed in U.S. Pat. No. 7,365,128, and U.S. Patent Application Publication No. 2010/0099514, the entire disclosures of which are hereby incorporated herein by reference; polylactic acids, including, but not limited to, those disclosed in U.S. Pat. No. 7,642,319, the entire disclosure of which is hereby incorporated herein by reference; and the modifiers disclosed in U.S. Patent Application Publication No. 2010/0099514 and 2009/0203469, the entire disclosures of which are hereby incorporated herein by reference. Flow enhancing additives also include, but are not limited to, montanic acids, esters of montanic acids and salts thereof, bis-stearoylethylenediamine, mono- and polyalcohol esters such as pentaerythritol tetrastearate, zwitterionic compounds, and metallocene-catalyzed polyethylene and polypropylene wax, including maleic anhydride modified versions thereof, amide waxes and alkylene diamides such as bistearamides. Particularly suitable fatty amides include, but are not limited to, saturated fatty acid monoamides (e.g., lauramide, palmitamide, arachidamide behenamide, stearamide, and 12-hydroxy stearamide); unsaturated fatty acid monoamides (e.g., oleamide, erucamide, and ricinoleamide); N-substituted fatty acid amides (e.g., N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl erucamide, and erucyl stearamide, N-oleyl palmitamide, methylol amide (more preferably, methylol stearamide, methylol behenamide); saturated fatty acid bis-amides (e.g., methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide); unsaturated fatty acid bis-amides (e.g., ethylene bis-oleamide, hexamethylene bis-oleamide, N,N'-dioleyl adipamide, N,N'-dioleyl sebacamide); and saturated and unsaturated fatty acid tetra amides, stearyl erucamide, ethylene bis stearamide and ethylene bis oleamide. Suitable examples of commercially available fatty amides include, but are not limited to, Kemamide® fatty acids, such as Kemamide® B (behenamide/arachidamide), Kemamide® W40 (N,N'-ethylenebisstearamide), Kemamide® P181 (oleyl palmitamide), Kemamide® S (stearamide), Kemamide® U (oleamide), Kemamide® E (erucamide), Kemamide® O (oleamide), Kemamide® W45 (N,N'-ethylenebisstearamide), Kenamide® W20 (N,N'-ethylenebisoleamide), Kemamide® E180 (stearyl erucamide), Kemamide® E221 (erucyl erucamide), Kemamide® S180 (stearyl stearamide), Kemamide® 5221 (erucyl stearamide), commercially available from Chemtura Corporation; and Crodamide® fatty amides, such as Crodamide® OR (oleamide), Crodamide® ER (erucamide), Crodamide® SR (stereamide), Crodamide® BR (behenamide), Crodamide® 203 (oleyl palmitamide), and Crodamide® 212 (stearyl erucamide), commercially available from Croda Universal Ltd.

In a particular embodiment, the matrix composition is modified with organic fiber micropulp, as disclosed, for example, in U.S. Pat. No. 7,504,448, the entire disclosure of which is hereby incorporated herein by reference.

In another particular embodiment, the matrix composition is modified with rosin, particularly when the matrix composition includes an ionomer, as disclosed, for example, in U.S. Pat. Nos. 7,429,624 and 7,238,737, the entire disclosures of which are hereby incorporated herein by reference.

In another particular embodiment, the matrix composition comprises at least one nanoclay, preferably wherein the total amount of nanoclay present is from 3 to 25 wt % based on the total weight of the composition, and an ionomer. In a particular aspect of this embodiment, the ionomer is at least partially neutralized with zinc. In another particular aspect of this embodiment, the ionomer is at least partially neutralized with sodium. In another particular aspect of this embodiment, the ionomer is at least partially neutralized with a first and a second cation, wherein the first cation is zinc.

Heterogeneous Golf Ball Composition

In a particular embodiment, the heterogeneous composition comprises discrete particles of rubber within a thermoplastic matrix formed from an acid copolymer composition wherein the acid copolymer is selected from one or more E/X- and E/X/Y-type acid copolymers of ethylene, an $\alpha,\beta$-unsaturated carboxylic acid, and optionally a softening comonomer. The rubber particles are preferably formed from a rubber composition that is substantially free of reactive metal ingredients, such that less than 5% of all acid groups present in the matrix composition are neutralized. Alternatively, the rubber particles are formed from a rubber composition that includes reactive metal(s), however, when the heterogeneous composition and golf ball layer formed therefrom are processed, reaction conditions are selected such that less than 5% of all acid groups present in the matrix composition are neutralized.

In a particular aspect of this embodiment, less than 5% of all acid groups present in the matrix composition are neutralized. In another particular aspect of this embodiment, less than 3% of all acid groups present in the matrix composition are neutralized. In another particular aspect of this embodiment, less than 1% of all acid groups present in the matrix composition are neutralized.

Golf Ball Applications

Golf ball compositions according to the present invention can be used in a variety of constructions. For example, the compositions are suitable for use in one-piece, two-piece (i.e., a core and a cover), multi-layer (i.e., a core of one or more layers and a cover of one or more layers), and wound golf balls, having a variety of core structures, intermediate layers, covers, and coatings.

In golf balls of the present invention, at least one layer comprises a heterogeneous composition comprising discrete particles of crosslinked material within a thermoplastic matrix, as described herein. In golf balls having two or more layers comprising a composition of the present invention, the inventive composition of one layer may be the same as or a different inventive composition than another layer. The layer(s) comprising a composition of the present invention can be any one or more of a core layer, an intermediate layer, or a cover layer.

Core Layer(s)

Cores of the golf balls formed according to the invention may be solid, semi-solid, hollow, fluid-, powder-, or gas-filled, and may be one-piece or multi-layered. Multilayer cores include a center, innermost portion, which may be solid, semi-solid, hollow, fluid-, powder-, or gas-filled, surrounded by at least one outer core layer. The outer core layer may be solid, or it may be a wound layer formed of a tensioned elastomeric material. For purposes of the present disclosure, the term "semi-solid" refers to a paste, a gel, or the like.

In a particular embodiment, the present invention provides a golf ball having an innermost core layer formed from a heterogeneous composition of the present invention. In another particular embodiment, the present invention provides a golf ball having an outer core layer formed from a heterogeneous composition of the present invention. In another particular embodiment, the present invention provides a golf ball having an intermediate core layer formed from a heterogeneous composition of the present invention.

Golf ball cores of the present invention may include one or more layers formed from a suitable material other than a heterogeneous composition of the present invention. Suitable core materials include, but are not limited to, thermoset materials, such as styrene butadiene rubber, polybutadiene, synthetic or natural polyisoprene, and trans-polyisoprene; thermoplastics, such as ionomer resins, polyamides and polyesters; and thermoplastic and thermoset polyurethane and polyureas.

Intermediate Layers)

When the golf ball of the present invention includes one or more intermediate layers, i.e., layer(s) disposed between the core and the cover of a golf ball, each intermediate layer can include any materials known to those of ordinary skill in the art including thermoplastic and thermosetting materials.

In one embodiment, the present invention provides a golf ball having one or more intermediate layers formed from a heterogeneous composition of the present invention.

Also suitable for forming intermediate layer(s) are the compositions disclosed above for forming core layers.

A moisture vapor barrier layer is optionally employed between the core and the cover. Moisture vapor barrier layers are further disclosed, for example, in U.S. Pat. Nos. 6,632,147, 6,838,028, 6,932,720, 7,004,854, and 7,182,702, and U.S. Patent Application Publication Nos. 2003/0069082, 2003/0069085, 2003/0130062, 2004/0147344, 2004/0185963, 2006/0068938, 2006/0128505 and 2007/0129172, the entire disclosures of which are hereby incorporated herein by reference.

Cover

Golf ball covers of the present invention include single, dual, and multilayer covers. Dual and multilayer covers have an inner cover layer and an outer cover layer, and multilayer covers additionally have at least one intermediate cover layer disposed between the inner cover layer and the outer cover layer.

In a particular embodiment, the present invention provides a golf ball having an outermost cover layer formed from a heterogeneous composition of the present invention. In another particular embodiment, the present invention provides a golf ball having an inner cover layer formed from a heterogeneous composition of the present invention. In another particular embodiment, the present invention provides a golf ball having an intermediate cover layer formed from a heterogeneous composition of the present invention.

Golf ball covers of the present invention may include one or more layers formed from a suitable material other than a heterogeneous composition of the present invention. The cover material is preferably a tough, cut-resistant material, selected based on the desired performance characteristics. Suitable cover materials for the golf balls disclosed herein include, but are not limited to, polyurethanes, polyureas, and hybrids of polyurethane and polyurea; ionomer resins and blends thereof (e.g., Surlyn® ionomer resins and DuPont® HPF 1000 and HPF 2000 highly neutralized ionomers, commercially available from E. I. du Pont de Nemours and Company; Iotek® ionomers, commercially available from Exxon-Mobil Chemical Company; Amplify® IO ionomers of ethylene acrylic acid copolymers, commercially available from The Dow Chemical Company; and Clarix® ionomer resins, commercially available from A. Schulman Inc.); polyisoprene; polyoctenamer, such as Vestenamer® polyoctenamer, commercially available from Evonik Industries; polyethylene, including, for example, low density polyethylene, linear low density polyethylene, and high density polyethylene; polypropylene; rubber-toughened olefin polymers; non-ionomeric acid copolymers, e.g., ethylene (meth)acrylic acid; plastomers; flexomers; styrene/butadiene/styrene block copolymers; polybutadiene; styrene butadiene rubber; ethylene propylene rubber; ethylene propylene diene rubber; styrene/ethylene-butylene/styrene block copolymers; dynamically vulcanized elastomers; ethylene vinyl acetates; ethylene (meth)acrylates; polyvinyl chloride resins; polyamides, amide-ester elastomers, and copolymers of ionomer and polyamide, including, for example, Pebax® thermoplastic polyether and polyester amides, commercially available from Arkema Inc; crosslinked trans-polyisoprene and blends thereof; polyester-based thermoplastic elastomers, such as Hytrel® polyester elastomers, commercially available from E. I. du Pont de Nemours and Company, and Riteflex® polyester elastomers, commercially available from Ticona; polyurethane-based thermoplastic elastomers, such as Elastollan®, commercially available from BASF; synthetic or natural vulcanized rubber; and combinations thereof.

Polyurethanes, polyureas, and polyurethane-polyurea hybrids (i.e., blends and copolymers of polyurethanes and polyureas) are particularly suitable for forming cover layers of the present invention. Suitable polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Compositions comprising an ionomer or a blend of two or more ionomers are also particularly suitable for forming cover layers. Preferred ionomeric cover compositions include:

(a) a composition comprising a "high acid ionomer" (i.e., having an acid content of greater than 16 wt %), such as Surlyn® 8150;

(b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn® 8150 and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;

(c) a composition comprising a 50/45/5 blend of Surlyn® 8940/Surlyn® 9650/Nucrel® 960, preferably having a material hardness of from 80 to 85 Shore C;

(d) a composition comprising a 50/25/25 blend of Surlyn® 8940/Surlyn® 9650/Surlyn® 9910, preferably having a material hardness of about 90 Shore C;

(e) a composition comprising a 50/50 blend of Surlyn® 8940/Surlyn® 9650, preferably having a material hardness of about 86 Shore C;

(f) a composition comprising a blend of Surlyn® 7940/Surlyn® 8940, optionally including a melt flow modifier;

(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid polymer or ester polymer; and (h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8150, 40-50 wt % Surlyn® 9120, and 0-10 wt % Surlyn® 6320).

Surlyn® 8150 and Surlyn® 8940 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from E. I. du Pont de Nemours and Company.

Ionomeric cover compositions can be blended with non-ionic thermoplastic resins, such as polyurethane, poly-ether-ester, poly-amide-ether, polyether-urea, thermoplastic polyether block amides (e.g., Pebax® polyether and polyester amides, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, polyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Ionomer golf ball cover compositions may include a flow modifier, such as, but not limited to, acid copolymer resins (e.g., Nucrel® acid copolymer resins, and particularly Nucrel® 960, commercially available from E. I. du Pont de Nemours and Company), performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

Component Dimensions

Dimensions of golf ball components, i.e., thickness and diameter, may vary depending on the desired properties. For the purposes of the invention, any layer thickness may be employed.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used.

Golf ball cores of the present invention include single, dual, and multilayer cores, and preferably have an overall diameter within the range having a lower limit of 0.75 inches or 1 inch or 1.25 inches or 1.4 inches and an upper limit of 1.55 inches or 1.6 inches or 1.62 inches or 1.63 inches. In a particular embodiment, the golf ball comprises a core and a cover, wherein the core is a solid, single layer having a diameter within a range having a lower limit of 0.750 or 1.00 or 1.10 or 1.15 or 1.20 or 1.25 or 1.30 or 1.40 or 1.50 or 1.53 or 1.55 inches and an upper limit of 1.55 or 1.60 or 1.62 or 1.63 or 1.65 inches. In another particular embodiment, the golf ball comprises a core and a cover, wherein the core comprises an inner core layer and an outer core layer, the inner core layer having a diameter within a range having a lower limit of 0.500 or 0.750 or 0.900 or 0.950 or 1.000 inches and an upper limit of 1.100 or 1.200 or 1.250 or 1.400 or 1.550 or 1.570 or 1.580 inches, and the outer core having a thickness within the range having a lower limit of 0.020 or 0.025 or 0.032 or 0.050 or 0.100 or 0.200 inches and an upper limit of 0.310 or 0.440 or 0.500 or 0.560 or 0.800 inches.

When present in a golf ball of the present invention, each intermediate layer has a thickness within a range having a lower limit of 0.002 or 0.010 or 0.020 or 0.025 or 0.030 inches and an upper limit of 0.035 or 0.040 or 0.045 or 0.050 or 0.060 or 0.090 or 0.100 or 0.150 or 0.200 inches. The total thickness of intermediate core layer(s) in golf balls of the present invention is preferably within the range having a lower limit of 0.020 or 0.0250 or 0.032 inches and an upper limit of 0.150 or 0.220 or 0.28 inches.

Golf ball covers of the present invention include single, dual, and multilayer covers, and preferably have an overall thickness within the range having a lower limit of 0.01 inches or 0.02 inches or 0.025 inches or 0.03 inches or 0.04 inches or 0.045 inches or 0.05 inches or 0.06 inches and an upper limit of 0.07 inches or 0.075 inches or 0.08 inches or 0.09 inches or 0.1 inches or 0.15 inches or 0.2 inches or 0.3 inches or 0.5 inches. Dual and multilayer covers have an inner cover layer and an outer cover layer, and multilayer covers additionally have at least one intermediate cover layer disposed between the inner cover layer and the outer cover layer. In a particular embodiment, the cover is a single layer having a thickness within a range having a lower limit of 0.020 or 0.025 or 0.030 inches and an upper limit of 0.030 or 0.040 or 0.045 or 0.050 or 0.070 or 0.100 or 0.120 or 0.150 or 0.350 or 0.400 or inches. In another particular embodiment, the cover comprises an inner cover layer and an outer cover layer, the inner cover having a thickness within a range having a lower limit of 0.010 or 0.020 or 0.025 or 0.030 inches and an upper limit of 0.035 or 0.040 or 0.050 or 0.150 or 0.200 inches, and the outer cover having a thickness within a range having a lower limit of 0.010 or 0.020 or 0.025 or 0.030 inches and an upper limit of 0.035 or 0.040 or 0.050 inches.

The golf balls of the present invention may be painted, coated, or surface treated for further benefits.

EXAMPLES

It should be understood that the examples below are for illustrative purposes only. In no manner is the present invention limited to the specific disclosures therein.

The following polymer materials were used in the below examples:

Amplify® GR204 maleic anhydride grafted HDPE having a density of 0.953 g/cm and Amplify® GR205 maleic anhydride grafted HDPE having a density of 0.962 g/cm, commercially available from The Dow Chemical Company;

Elvaloy® AC 3427 ethylene-butyl acrylate copolymer having a comonomer content of 27 wt %, commercially available from E. I. du Pont de Nemours and Company;

Estane® 58133 thermoplastic polyurethane having a Shore D hardness of 55, commercially available from The Lubrizol Corporation;

Fusabond® 525D metallocene-catalyzed polyethylene, Fusabond® E100 anhydride modified HDPE, Fusabond® N416 chemically modified ethylene elastomer, Fusabond® P613 functionalized polypropylene, commercially available from E. I. du Pont de Nemours and Company;

Grivory® GTR45 partially aromatic polyamide, commercially available from EMS Grivory;

DuPont® HPF 1000 and HPF 2000 ethylene/acrylic acid copolymer in which the acid groups have been highly neutralized with magnesium ions, commercially available from E. I. du Pont de Nemours and Company;

Hytrel® 3078 very low modulus thermoplastic polyester elastomer having a Shore D hardness of 30, and Hytrel® 8241 thermoplastic polyester elastomer having a Shore D hardness of 65, commercially available from E. I. du Pont de Nemours and Company;

Lotader® 4700 ethylene/acrylic ester/maleic anhydride random copolymer, commercially available from Arkema Corporation;

NBR 6300 nitrile butadiene rubber powder, commercially available from LG Chem;

Nucrel® 0910, Nucrel® 2906, Nucrel® 9-1, Nucrel® 960, and Nucrel® AE ethylene methacrylic acid copolymers, commercially available from E. I. du Pont de Nemours and Company;

Pebax® 2533 polyether block amide, commercially available from Arkema Inc.;

Pliolite® styrene butadiene, commercially available from Eliokem;

Royaltuf® 485 maleic anhydride modified polyolefin based on a semi-crystalline EPDM, and Royaltuf® 498 maleic anhydride modified polyolefin based on an amorphous EPDM, commercially available from Chemtura Corporation;

Surlyn® 7940 ethylene/methacrylic acid/acrylate copolymer (15 wt % acid) in which the acid groups have been partially neutralized with lithium ions, Surlyn® 8320 very low modulus ethylene/methacrylic acid/acrylate copolymer (9 wt % acid) in which the acid groups have been partially neutralized with sodium ions, Surlyn® 8528 E/MAA copolymer (10 wt % acid) in which the acid groups have been partially neutralized with sodium ions, Surlyn®AD8546 E/MAA copolymer (19 wt % acid) in which the acid groups have been partially neutralized with lithium ions, Surlyn® 8940 E/MAA copolymer (15 wt % acid) in which the acid groups have been partially neutralized with sodium ions, Surlyn® 9150 E/MAA copolymer in which the acid groups have been partially neutralized with zinc ions, commercially available from E. I. du Pont de Nemours and Company;

Texin® 970 U aromatic polyether-based thermoplastic polyurethane having a Shore D hardness of 70, commercially available from Bayer AG;

Tire Tread ground tire tread, commercially available from Edge Rubber;

TP-301 transpolyisoprene, commercially available from Kuraray;

Vestenamer® 8012 high trans content polyoctenamer rubber, commercially available from Evonik Industries;

X Outer Rgnd-2007, regrind (i.e., ground flash) from production of the outer core of the 2007 model ProV1x® golf ball; and X Outer Rgnd-2011, regrind (i.e., ground flash) from production of the outer core of the 2011 model ProV1x® golf ball.

Various compositions were melt blended using components as given in Table 1 below. The relative amounts of each component used are also indicated in Table 1 below, and are reported in wt %, based on the total weight of the composition.

TABLE 1

| Example | Component 1 | wt % | Component 2 | wt % | Component 3 | wt % |
|---|---|---|---|---|---|---|
| 1 | Amplify GR204 | 100 | — | — | — | — |
| 2 | Amplify GR204 | 45 | X Outer Rgnd - 2011 | 55 | — | — |
| 3 | Amplify GR205 | 100 | — | — | — | — |

TABLE 1-continued

| Example | Component 1 | wt % | Component 2 | wt % | Component 3 | wt % |
|---|---|---|---|---|---|---|
| 4 | Amplify GR205 | 45 | X Outer Rgnd - 2011 | 55 | — | — |
| 5 | Amplify GR205 | 66 | X Outer Rgnd - 2011 | 33 | — | — |
| 6 | Amplify GR205 | 83.5 | X Outer Rgnd - 2011 | 16.5 | — | — |
| 7 | Elvaloy 3427AC | 100 | — | — | — | — |
| 8 | Elvaloy 3427AC | 70 | X Outer Rgnd - 2007 | 30 | — | — |
| 9 | Elvaloy 3427AC | 60 | X Outer Rgnd - 2007 | 40 | — | — |
| 10 | Elvaloy 3427AC | 50 | X Outer Rgnd - 2007 | 50 | — | — |
| 11 | Elvaloy 3427AC | 100 | — | — | — | — |
| 12 | Elvaloy 3427AC | 50 | NBR 6300 | 50 | — | — |
| 13 | Estane 58133 | 100 | — | — | — | — |
| 14 | Estane 58133 | 70 | NBR 6300 | 30 | — | — |
| 15 | Fusabond 525D | 100 | — | — | — | — |
| 16 | Fusabond 525D | 70 | X Outer Rgnd - 2007 | 30 | — | — |
| 17 | Fusabond 525D | 60 | X Outer Rgnd - 2007 | 40 | — | — |
| 18 | Fusabond 525D | 50 | X Outer Rgnd - 2007 | 50 | — | — |
| 19 | Fusabond 525D | 20 | X Outer Rgnd - 2011 | 80 | — | — |
| 20 | Fusabond E100 | 100 | — | — | — | — |
| 21 | Fusabond E100 | 45 | X Outer Rgnd - 2011 | 55 | — | — |
| 22 | Fusabond N416 | 100 | — | — | — | — |
| 23 | Fusabond P613 | 100 | — | — | — | — |
| 24 | Fusabond P613 | 25 | X Outer Rgnd - 2011 | 75 | — | — |
| 25 | Fusabond P613 | 45 | X Outer Rgnd - 2011 | 55 | — | — |
| 26 | Fusabond P613 | 60 | X Outer Rgnd - 2011 | 40 | — | — |
| 27 | Fusabond P613 | 70 | X Outer Rgnd - 2011 | 30 | — | — |
| 28 | Fusabond P613 | 80 | X Outer Rgnd - 2011 | 20 | — | — |
| 29 | Grivory GTR45 | 67 | NBR 6300 | 33 | — | — |
| 30 | Grivory GTR45 | 100 | — | — | — | — |
| 31 | Grivory GTR45 | 45 | X Outer Rgnd - 2011 | 55 | — | — |
| 32 | Grivory GTR45 | 70 | X Outer Rgnd - 2011 | 30 | — | — |
| 33 | Grivory GTR45 | 60 | X Outer Rgnd - 2011 | 40 | — | — |
| 34 | Grivory GTR45 | 90 | X Outer Rgnd - 2011 | 10 | — | — |
| 35 | Grivory GTR45 | 80 | X Outer Rgnd - 2011 | 20 | — | — |
| 36 | HPF 1000 | 100 | — | — | — | — |
| 37 | HPF 1000 | 70 | NBR 6300 | 30 | — | — |
| 38 | HPF 1000 | 60 | X Outer Rgnd - 2011 | 40 | — | — |
| 39 | HPF 1000 | 70 | X Outer Rgnd - 2011 | 30 | — | — |
| 40 | HPF 1000 | 80 | X Outer Rgnd - 2011 | 20 | — | — |
| 41 | HPF 1000 | 90 | X Outer Rgnd - 2011 | 10 | — | — |
| 42 | HPF 2000 | 60 | X Outer Rgnd - 2011 | 40 | — | — |
| 43 | HPF 2000 | 70 | X Outer Rgnd - 2011 | 30 | — | — |
| 44 | HPF 2000 | 80 | X Outer Rgnd - 2011 | 20 | — | — |
| 45 | HPF 2000 | 90 | X Outer Rgnd - 2011 | 10 | — | — |
| 46 | Hytrel 3078 | 100 | — | — | — | — |
| 47 | Hytrel 3078 | 45 | X Outer Rgnd - 2011 | 55 | — | — |
| 48 | Hytrel 3078 | 60 | X Outer Rgnd - 2011 | 40 | — | — |
| 49 | Hytrel 3078 | 80 | X Outer Rgnd - 2011 | 20 | — | — |
| 50 | Hytrel 3078 | 50 | NBR 6300 | 50 | — | — |
| 51 | Hytrel 8241 | 100 | — | — | — | — |
| 52 | Hytrel 8241 | 80 | NBR 6300 | 20 | — | — |
| 53 | Lotader 4700 | 100 | — | — | — | — |
| 54 | Lotader 4700 | 45 | X Outer Rgnd - 2011 | 55 | — | — |
| 55 | Lotader 4700 | 60 | X Outer Rgnd - 2011 | 40 | — | — |
| 56 | Lotader 4700 | 70 | X Outer Rgnd - 2011 | 30 | — | — |
| 57 | Lotader 4700 | 80 | X Outer Rgnd - 2011 | 20 | — | — |
| 58 | Nucrel 0910 | 100 | — | — | — | — |
| 59 | Nucrel 0910 | 45 | X Outer Rgnd - 2007 | 55 | — | — |
| 60 | Nucrel 2906 | 45 | X Outer Rgnd - 2007 | 55 | — | — |
| 61 | Nucrel 2906 | 100 | — | — | — | — |
| 62 | Nucrel 9-1 | 100 | — | — | — | — |
| 63 | Nucrel 9-1 | 45 | X Outer Rgnd - 2007 | 55 | — | — |
| 64 | Nucrel 9-1 | 100 | — | — | — | — |
| 65 | Nucrel 9-1 | 45 | NBR 6300 | 55 | — | — |
| 66 | Nucrel 9-1 | 100 | — | — | — | — |
| 67 | Nucrel 960 | 100 | — | — | — | — |
| 68 | Nucrel 960 | 45 | X Outer Rgnd - 2007 | 55 | — | — |
| 69 | Nucrel 960 | 100 | — | — | — | — |
| 70 | Nucrel 960 | 100 | — | — | — | — |
| 71 | Nucrel 960 | 45 | NBR 6300 | 55 | — | — |
| 72 | Nucrel AE | 100 | — | — | — | — |
| 73 | Nucrel AE | 45 | NBR 6300 | 55 | — | — |
| 74 | Pebax 2533 | 100 | — | — | — | — |
| 75 | Pebax 2533 | 45 | X Outer Rgnd - 2011 | 55 | — | — |
| 76 | Pebax 2533 | 60 | X Outer Rgnd - 2011 | 40 | — | — |
| 77 | Pebax 2533 | 70 | X Outer Rgnd - 2011 | 30 | — | — |
| 78 | Pebax 2533 | 80 | X Outer Rgnd - 2011 | 20 | — | — |
| 79 | Pebax 2533 | 90 | X Outer Rgnd - 2011 | 10 | — | — |
| 80 | Pliolite | 100 | — | — | — | — |
| 81 | Pliolite | 70 | NBR 6300 | 30 | — | — |

TABLE 1-continued

| Example | Component 1 | wt % | Component 2 | wt % | Component 3 | wt % |
|---|---|---|---|---|---|---|
| 82 | Royaltuf 485 | 45 | X Outer Rgnd - 2011 | 55 | — | — |
| 83 | Royaltuf 498 | 45 | X Outer Rgnd - 2011 | 55 | — | — |
| 84 | Surlyn 7940 | 50 | Surlyn 8940 | 50 | — | — |
| 85 | Surlyn 7940 | 47.5 | Surlyn 8940 | 47.5 | X Outer Rgnd - 2011 | 5 |
| 86 | Surlyn 7940 | 45 | Surlyn 8940 | 45 | X Outer Rgnd - 2011 | 10 |
| 87 | Surlyn 7940 | 40 | Surlyn 8940 | 40 | X Outer Rgnd - 2011 | 20 |
| 88 | Surlyn 7940 | 35 | Surlyn 8940 | 35 | X Outer Rgnd - 2011 | 30 |
| 89 | Surlyn 7940 | 30 | Surlyn 8940 | 30 | X Outer Rgnd - 2011 | 40 |
| 90 | Surlyn 7940 | 22.5 | Surlyn 8940 | 22.5 | X Outer Rgnd - 2011 | 55 |
| 91 | Surlyn 7940 | 49.5 | Surlyn 8940 | 49.5 | Tire Tread | 1 |
| 92 | Surlyn 7940 | 49 | Surlyn 8940 | 49 | Tire Tread | 2 |
| 93 | Surlyn 7940 | 47.5 | Surlyn 8940 | 47.5 | Tire Tread | 5 |
| 94 | Surlyn 7940 | 45 | Surlyn 8940 | 45 | Tire Tread | 10 |
| 95 | Surlyn 7940 | 40 | Surlyn 8940 | 40 | Tire Tread | 20 |
| 96 | Surlyn 7940 | 35 | Surlyn 8940 | 35 | Tire Tread | 30 |
| 97 | Surlyn 7940 | 30 | Surlyn 8940 | 30 | Tire Tread | 40 |
| 98 | Surlyn 7940 | 22.5 | Surlyn 8940 | 22.5 | Tire Tread | 55 |
| 99 | Surlyn 8320 | 100 | — | — | — | — |
| 100 | Surlyn 8320 | 60 | NBR 6300 | 40 | — | — |
| 101 | Surlyn 8528 | 100 | — | — | — | — |
| 102 | Surlyn 9150 | 100 | — | — | — | — |
| 103 | Surlyn AD8546 | 100 | — | — | — | — |
| 104 | Surlyn AD8546 | 70 | NBR 6300 | 30 | — | — |
| 105 | Texin 970U | 100 | — | — | — | — |
| 106 | Texin 970U | 50 | NBR 6300 | 50 | — | — |
| 107 | TP-301 | 70 | NBR 6300 | 30 | — | — |
| 108 | TP-301 | 100 | — | — | — | — |
| 109 | TP-301 | 70 | X Outer Rgnd - 2011 | 30 | — | — |
| 110 | TP-301 | 80 | X Outer Rgnd - 2011 | 20 | — | — |
| 111 | TP-301 | 90 | X Outer Rgnd - 2011 | 10 | — | — |
| 112 | Vestenamer 8012 | 100 | — | — | — | — |
| 113 | Vestenamer 8012 | 70 | X Outer Rgnd - 2011 | 30 | — | — |
| 114 | Vestenamer 8012 | 80 | X Outer Rgnd - 2011 | 20 | — | — |
| 115 | Vestenamer 8012 | 90 | X Outer Rgnd - 2011 | 10 | — | — |
| 116 | Vestenamer 8012 | 60 | X Outer Rgnd - 2011 | 40 | — | — |
| 117 | Vestenamer 8012 | 45 | X Outer Rgnd - 2011 | 55 | — | — |
| 118 | Vestenemer 8012 | 70 | NBR 6300 | 30 | — | — |

Melt flow of each composition was measured according to ASTM D-1238, condition E, at 190° C., using a 2.16 kg weight, and the results are reported in Table 2 below.

Flex modulus of each composition was measured according to the following procedure, and the results are reported in Table 2 below. Flex bars are prepared by compression molding the composition under sufficient temperature and pressure for a sufficient amount of time to produce void- and defect-free plaques of appropriate dimensions to produce the required flex bars. The flex bar dimensions are about 0.125 inches by about 0.5 inches, and of a length sufficient to satisfy the test requirements. Flex bars are died out from the compression molded plaque(s) soon after the blend composition has reached room temperature. The flex bars are then aged for 14 days at 23° C. and 50% RH before testing. Flex modulus is then measured according to ASTM D790 Procedure B, using a load span of 1.0 inches, a support span length of 2.0 inches, a support span-to-depth ratio of 16:1 and a crosshead rate of 0.5 inches/minute. The support and loading noses have a radius of 5 mm.

Solid spheres of each composition were injection molded, and the solid sphere COR, compression, Shore C hardness, and Shore D hardness of the resulting spheres were measured. The results are reported in Table 2 below. The surface hardness of a sphere is obtained from the average of a number of measurements taken from opposing hemispheres, taking care to avoid making measurements on the parting line of the sphere or on surface defects, such as holes or protrusions. Hardness measurements are made pursuant to ASTM D-2240 "Indentation Hardness of Rubber and Plastic by Means of a Durometer." Because of the curved surface, care must be taken to insure that the sphere is centered under the durometer indentor before a surface hardness reading is obtained. A calibrated, digital durometer, capable of reading to 0.1 hardness units is used for all hardness measurements and is set to record the maximum hardness reading obtained for each measurement. The digital durometer must be attached to, and its foot made parallel to, the base of an automatic stand. The weight on the durometer and attack rate conform to ASTM D-2240.

TABLE 2

| Ex. | Melt Flow (190° C., 2.16 kg) | Flex Modulus (ksi) | Solid Sphere COR | Solid Sphere Compression | Solid Sphere Shore C | Solid Sphere Shore D |
|---|---|---|---|---|---|---|
| 1 | * | * | 0.490 | 172 | 98 | 69 |
| 2 | * | * | 0.568 | 152 | 94 | 66 |
| 3 | * | 206.3 | 0.492 | 176 | 100 | 71 |
| 4 | * | * | 0.546 | 153 | 95 | 66 |
| 5 | * | * | 0.531 | 162 | 96 | 69 |
| 6 | * | * | 0.503 | 169 | 98 | 70 |
| 7 | 3.74 | 3.4 | 0.561 | 4 | 45 | 25 |
| 8 | 1.46 | 4.9 | 0.588 | 31 | 55 | 29 |
| 9 | 1.01 | 6.2 | 0.600 | 35 | 58 | 31 |
| 10 | 0.54 | 7.3 | 0.616 | 43 | 61 | 33 |
| 11 | * | * | 0.560 | 4 | 49.4 | 29.3 |
| 12 | * | * | * | * | * | * |
| 13 | * | * | 0.552 | 148 | 90 | 62 |
| 14 | * | * | 0.493 | 131 | 78 | 51 |
| 15 | * | 2.2 | 0.668 | −45 | 44 | 27 |
| 16 | 0.74 | 3.4 | 0.686 | * | 50 | 29 |
| 17 | 0.42 | 4 | 0.692 | 3 | 54 | 30 |
| 18 | 0.06 | 5.3 | 0.685 | 6 | 58 | 31 |

TABLE 2-continued

| Ex. | Melt Flow (190° C., 2.16 kg) | Flex Modulus (ksi) | Solid Sphere COR | Solid Sphere Compression | Solid Sphere Shore C | Solid Sphere Shore D |
|---|---|---|---|---|---|---|
| 19 | * | * | * | * | * | * |
| 20 | * | * | 0.491 | 174 | 100 | 70 |
| 21 | * | * | * | * | * | * |
| 22 | * | * | 0.655 | −54 | 36 | 20 |
| 23 | * | * | ** | 177 | 101 | 76 |
| 24 | * | * | 0.645 | 146 | 93 | 69 |
| 25 | * | * | 0.611 | 158 | 96 | 71 |
| 26 | * | * | ** | 174 | 99 | 74 |
| 27 | * | * | ** | 177 | 100 | 76 |
| 28 | * | * | ** | 174 | 100 | 77 |
| 29 | * | * | 0.664 | 176 | 99.9 | 74.5 |
| 30 | * | * | 0.870 | 183 | * | * |
| 31 | * | * | ** | 166 | 97 | 78 |
| 32 | * | * | 0.728 | 181 | 100 | 87 |
| 33 | * | * | ** | 169 | 97 | 81 |
| 34 | * | * | * | 184 | 100 | 88 |
| 35 | * | * | ** | 183 | 100 | 89 |
| 36 | * | * | 0.835 | 104 | 87 | 55 |
| 37 | * | * | 0.759 | 85 | 77 | 50 |
| 38 | * | * | 0.812 | 94 | 85 | 55 |
| 39 | * | * | 0.826 | 103 | 86 | 55 |
| 40 | * | * | 0.827 | 105 | 86 | 55 |
| 41 | * | * | 0.828 | 107 | 87 | 56 |
| 42 | * | * | 0.833 | 82 | 80 | 48 |
| 43 | * | * | 0.851 | 83 | 78 | 48 |
| 44 | * | * | 0.853 | 84 | 78 | 48 |
| 45 | * | * | 0.856 | 86 | 78 | 48 |
| 46 | * | * | 0.721 | −10 | 52 | 30 |
| 47 | * | * | 0.695 | 50 | 66 | 39 |
| 48 | * | * | 0.714 | 28 | 60 | 35 |
| 49 | * | * | 0.717 | −7 | 54 | 31 |
| 50 | * | * | 0.581 | −61 | 36 | 22 |
| 51 | * | * | 0.638 | 155 | 96 | 67 |
| 52 | * | * | 0.583 | 144 | 89 | 61 |
| 53 | * | * | 0.580 | −71 | 36 | 22 |
| 54 | * | * | 0.645 | 13 | 58 | 35 |
| 55 | * | * | 0.607 | −17 | 50 | 29 |
| 56 | * | * | 0.594 | −32 | 44 | 26 |
| 57 | * | * | 0.582 | −45 | 41 | 23 |
| 58 | * | 36.4 | 0.504 | 132 | 83 | 50 |
| 59 | * | * | 0.626 | 125 | 86 | 56 |
| 60 | 1.2 | * | 0.687 | 133 | 90 | 57 |
| 61 | * | * | * | * | * | * |
| 62 | * | * | 0.448 | −35 | 37 | 22 |
| 63 | 0.6 | 7.8 | 0.623 | 55 | 70 | 43 |
| 64 | * | * | 0.449 | −32 | 40 | 23 |
| 65 | * | * | 0.435 | −74 | 33 | 19 |
| 66 | * | 3 | 0.449 | −32 | 40 | 23 |
| 67 | * | 15.1 | 0.554 | 129 | 84 | 53 |
| 68 | 2 | 31.3 | 0.666 | 123 | 87 | 57 |
| 69 | * | * | 0.559 | 129 | 84 | 54 |
| 70 | * | * | 0.554 | 129 | 84 | 53 |
| 71 | * | * | 0.439 | 70 | 60 | 35 |
| 72 | * | 18.6 | 0.495 | 114 | 76 | 47 |
| 73 | * | * | 0.427 | 47 | 53 | 32 |
| 74 | * | * | 0.679 | −36 | 45 | 26 |
| 75 | * | * | 0.710 | 42 | 64 | 37 |
| 76 | * | * | 0.683 | 0 | 50 | 29 |
| 77 | * | * | 0.684 | −3 | 47 | 27 |
| 78 | * | * | 0.680 | −11 | 43 | 26 |
| 79 | * | * | 0.677 | −16 | 42 | 25 |
| 80 | * | * | * | * | * | * |
| 81 | * | * | 0.501 | 175 | 99 | 70 |
| 82 | * | * | * | * | * | * |
| 83 | * | * | * | * | * | * |
| 84 | * | * | 0.744 | 158 | 97 | 70 |
| 85 | * | * | 0.734 | 157 | 96 | 69 |
| 86 | * | * | 0.740 | 155 | 96 | 70 |
| 87 | * | * | 0.745 | 152 | 95 | 69 |
| 88 | * | * | 0.737 | 151 | 94 | 68 |
| 89 | * | * | 0.733 | 147 | 94 | 67 |
| 90 | * | * | 0.752 | 138 | 92 | 65 |
| 91 | * | * | 0.742 | 161 | 96 | 69 |
| 92 | * | * | 0.742 | 162 | 96 | 69 |
| 93 | * | * | 0.738 | 161 | 96 | 69 |
| 94 | * | * | 0.739 | 157 | 95 | 68 |
| 95 | * | * | 0.720 | 155 | 95 | 68 |
| 96 | * | * | 0.715 | 152 | 93 | 67 |
| 97 | * | * | 0.703 | 149 | 92 | 64 |
| 98 | * | * | 0.658 | 111 | 83 | 55 |
| 99 | * | 4.7 | 0.601 | 55 | 61 | 36 |
| 100 | * | * | 0.551 | 9 | 56 | 32 |
| 101 | * | 35.6 | 0.628 | 147 | 91 | 63 |
| 102 | * | 50.6 | 0.700 | 157 | 96 | 70 |
| 103 | * | 80.7 | 0.778 | 162 | 96 | 70 |
| 104 | * | * | 0.715 | 149 | 92 | 65 |
| 105 | * | * | 0.574 | 152 | 95 | 69 |
| 106 | * | * | 0.486 | 99 | 71 | 51 |
| 107 | * | * | 0.535 | 126 | 75 | 45 |
| 108 | * | * | 0.600 | 144 | 84 | 54 |
| 109 | * | * | 0.621 | 134 | 86 | 56 |
| 110 | * | * | 0.594 | 142 | 84 | 55 |
| 111 | * | * | 0.590 | 140 | 85 | 55 |
| 112 | * | 26 | 0.568 | 102 | 75 | 44 |
| 113 | * | * | 0.588 | 100 | 73 | 44 |
| 114 | * | * | 0.582 | 98 | 72 | 44 |
| 115 | * | * | 0.578 | 98 | 72 | 43 |
| 116 | * | * | 0.595 | 101 | 73 | 44 |
| 117 | * | * | 0.648 | 100 | 76 | 45 |
| 118 | * | * | 0.529 | 78 | 63 | 38 |

* not measured
** sphere broke during measurement

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising an innermost core layer formed from a heterogeneous composition, the heterogeneous composition comprising:
   a thermoplastic matrix formed from an acid copolymer composition wherein the acid copolymer is selected from one or more E/X- and E/X/Y-type acid copolymers of ethylene, an α,β-unsaturated carboxylic acid, and optionally a softening comonomer, and
   discrete particles of crosslinked rubber dispersed within the matrix,
   wherein the discrete particles are present in an amount of from 10 wt % to 40 wt %, based on the total weight of the heterogenous composition, and are formed from a rubber composition that is substantially free of reactive metal ingredients, and
   wherein less than 5% of all acid groups present in the matrix composition are neutralized.

2. The golf ball of claim 1, wherein less than 3% of all acid groups present in the matrix composition are neutralized.

3. The golf ball of claim 1, wherein less than 1% of all acid groups present in the matrix composition are neutralized.

4. The golf ball of claim 1, wherein the crosslinked rubber composition has a Shore D hardness of 60 or greater.

5. The golf ball of claim 1, wherein the crosslinked rubber composition has a Shore D hardness of 65 or greater.

6. The golf ball of claim 1, wherein the acid copolymer is ethylene acrylic acid.

7. The golf ball of claim 1, wherein the discrete particles have a particle size of from 1.19 mm to 2.38 mm.

* * * * *